United States Patent [19]

Burger

[11] 4,238,645
[45] Dec. 9, 1980

[54] VARIABLE LOOP TELEPHONE TRANSMISSION CIRCUIT

[75] Inventor: Victor G. Burger, Elmhurst, Ill.

[73] Assignee: GTE Automatic Electric Laboratories Incorporated, Northlake, Ill.

[21] Appl. No.: 974,393

[22] Filed: Dec. 29, 1978

[51] Int. Cl.² .............................................. H04M 1/58
[52] U.S. Cl. ................................................. 179/81 A
[58] Field of Search .............. 179/81 R, 81 A, 81 B, 179/170.2, 170 D

[56] References Cited

U.S. PATENT DOCUMENTS 3,517,138   6/1970   Burger ........................... 179/81 A Primary Examiner—James W. Moffitt
Assistant Examiner—Joseph A. Popek
Attorney, Agent, or Firm—Robert J. Black; Gregory G. Hendricks

[57] ABSTRACT

A subscriber station telephone circuit having a multiwinding transformer connected in a bridge configuration to couple the transmitter to the line and the balancing impedance in opposite phase. The receiver is magnetically coupled by the transformer so as to receive practically no side-tone during transmission. A varistor is employed as a regulator to control receiver signals.

6 Claims, 1 Drawing Figure

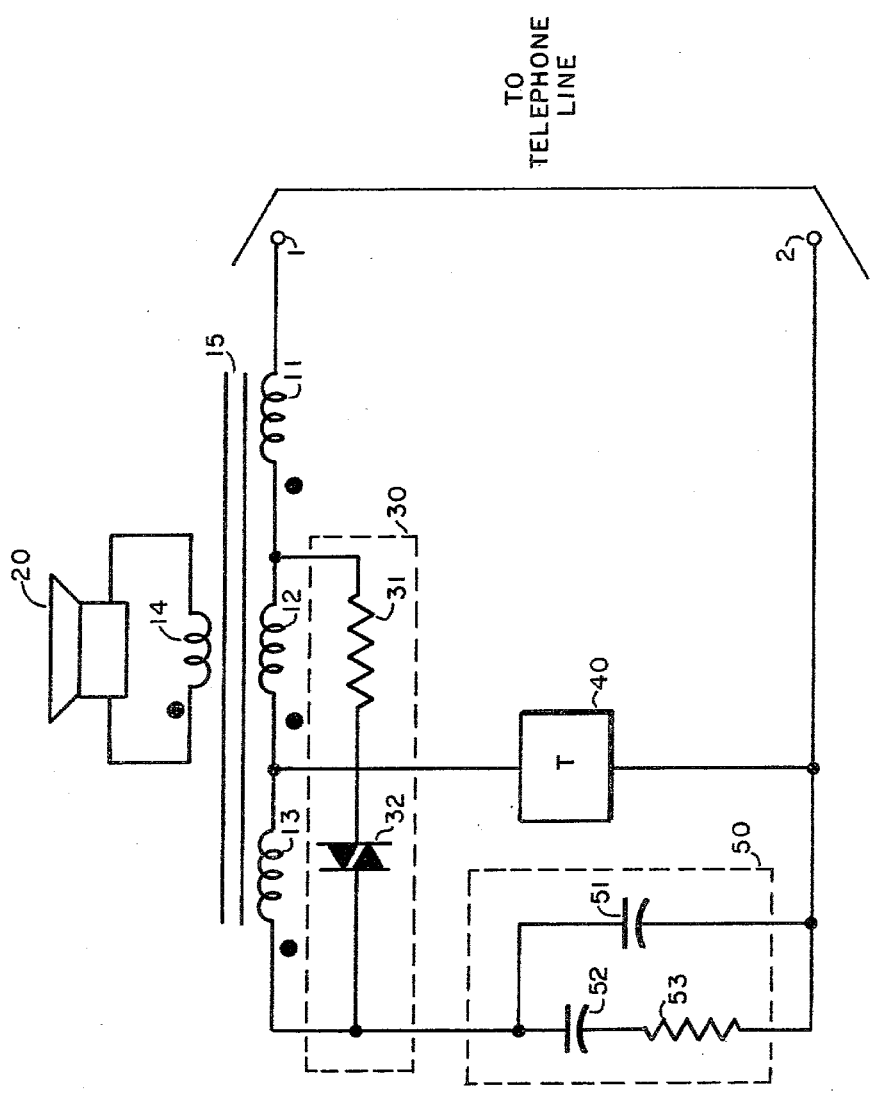
FIG. I

VARIABLE LOOP TELEPHONE TRANSMISSION CIRCUIT

BACKGROUND OF THE INVENTION (1) Field of the Invention

This invention relates to hybrid arrangements, and more particularly to transducer coupling, transmission level equalizing and to side-tone balancing circuits of the type useful in subscriber telephone sets.

(2) Descripton of the Prior Art

Present day two-wire subscriber telephone circuits are almost universally arranged in a hybrid configuration and are of the anti-side-tone type. The bridge transmission circuits shown in FIGS. 2, 3, 4 in U.S. Pat. No. 3,517,138 issued June 23, 1970 to V. G. Burger are representative of the prior art. These circuits utilize center tapped transformers in order to provide optimum power transfer through impedance matching between the transmitter, receiver, line and balance network. However, these circuits can only be used with high quality, high efficiency receivers. Lower efficiency receivers require greater power which can be provided to the receiver by using an unbalanced transformer. Such additional receiver power is provided only at the expense of decreased transmitter power.

Accordingly it is an object of the present invention to provide a novel technique of utilizing low cost, low efficiency loudspeaker type receivers in telephone substations without sacrificing transmitter efficiency.

SUMMARY OF THE INVENTION

The present invention is a circuit which allows the use of low efficiency loudspeaker type receivers in a telephone substation without a decrease in transmitter efficiency.

The circuit includes a four winding transformer with three of its windings connected in series. The first winding is also connected to the tip lead of a telephone substation. The fourth winding is magnetically coupled to the other three windings and is connected to a receiver. A balancing network is connected between the third winding and the ring lead of the telephone substation. This balancing network consists of a first capacitor connected in parallel with a series connection of a resistor and a second capacitor. The transmitter is connected to the second and third windings and the ring lead, and a receive signal regulator is connected in parallel with the second and third windings. This regulator consists of a second resistor connected in series with a varistor.

In the receive mode of operation the unbalanced winding arrangement of the three primary windings provide additional power to the low efficiency receiver through the secondary winding. However, this arrangement presents additional losses to the transmitter which would normally preclude such a winding arrangement but through the use of recently developed amplifier circuitry with low power requirements non carbon microphones can be employed and sufficient power can be generated to overcome such losses.

DESCRIPTON OF THE DRAWING

The single FIGURE of the accompaning drawing is a schematic diagram of a variable loop telephone transmission circuit in accordance with the present invention.

DESCRIPTION OF THE PREFERRED EMBODIMENT

Referring now to the accompanying drawing the variable loop transmission circuit of the present invention is included in a telephone substation and is shown connected to a telephone line.

Transformer windings 11, 12 and 13 are connected in series with winding 11 also connected to telephone line terminal 1. Transformer winding 14 is connected to receiver 20 and is magnetically coupled to windings 11, 12 and 13 via core 15. Balancing network 50 is connected to winding 13 and also to telephone line terminal 2. Balancing network 50 includes capacitor 52 connected to winding 13 and resistor 53 connected between capacitor 52 and terminal 2. It also includes capacitor 51 connected in parallel with capacitor 52 and resistor 53. Transmitter 40 which consists of an electret microphone and associated amplifier is connected to windings 12 and 13 and also to terminal 2. Receive signal regulator 30 is connected in parallel with the series connection of windings 12 and 13. Receive signal regulator 30 includes resistor 31 connected to winding 12 and varistor 32 connected in series with resistor 31 and also connected to winding 13.

In a preferred embodiment of the present invention windings 11, 12, 13 and 14 have the characteristics as shown in Table 1, and the line, transmitter, receiver and balance network have the impedances as shown in Table 2.

TABLE 1

| | |
|---|---|
| Coil 11 | 775 turns |
| Coil 12 | 258 turns |
| Coil 13 | 258 turns |
| Coil 14 | 425 turns |

TABLE 2

| | |
|---|---|
| $Z_L$ | 600 |
| $Z_T$ | 120 |
| $Z_R$ | 100 |
| $Z_{BN}$ | 150 |

In order to provide a no side-tone condition in the transmit mode of operation, the magnetic fields generated by windings 11, 12 and 13 must cancel out. Since the line impedance $Z_L$ is four times as large as the balance network impedance $Z_{BN}$, four times as much transmitter current flows to the balance network as flows to the line. Therefore, 4 times as many turns must be provided in the combination of windings 11 and 12 as are used in winding 13. As a result the magnetic flux generated by winding 13 is equal and oppositely poled to the magnetic flux generated by the combination of windings 11 and 12 providing the desired no side-tone condition.

In the receive mode of operation coils 11, 12 and 13 are all poled in the same direction causing their magnetic flux to add. This magnetic flux is coupled to coil 14 by iron core 15 and the resulting voltage developed across coil 14 drives receiver 20.

Receive signal regulator 30 is used to obtain receive signal regulation for variations in loop length since the received signal may be excessive with short loop lengths. Regulation of the received A.C. signal levels is effected by varistor 32 as a function of the increased D.C. current through and the D.C. voltage drop across coils 12 and 13. Resistor 31 in series with varistor 32 provides an optimized shunt value and also limits the minimum A.C. impedance that the shunt can present to coils 12 and 13. When so positioned within the circuit there is no effect upon the side-tone or circuit balance.

Transmitter 40 is not connected in the usual center tap position but rather in an unbalanced configuration in order that more power may be provided to receiver 20. This is required because the transmission circuit of the present invention permits utilization of low cost, low efficiency loudspeaker type receivers which require relatively large amounts of power to operate effectively.

With the use of this unbalanced winding arrangement in the transmitting mode of operation, the transmitter must drive a higher line impedance.

The unbalanced circuit is used in conjunction with transmitter 40 which as indicated consists of an electret microphone and associated amplifier which can supply the necessary power to drive the additional line impedance thus permitting the use of low cost, low efficiency loudspeaking type receivers in a telephone substation.

It will be obvious to those skilled in the art that numerous modifications of the present invention can be made without departing from the spirit of the invention which shall be limited only by the scope of the claims appended hereto.

What is claimed is:

1. A transmission circuit for use in a telephone substation including first and second line terminals connected to a telephone line, said transmission circuit comprising:
   an induction coil having first, second and third windings connected in series, said first winding also connected to said first line terminal and said third winding connected via a circuit connection to said second line terminal; said induction coil further including a fourth winding magnetically coupled to said first, second, and third windings; said first, second and third windings operated in response to incoming signals from said telephone line to generate a magnetic field through and a voltage across each winding;
   a receiver connected in parallel with said fourth winding; said fourth winding operated in response to said magnetic field generated by said first, second and third windings to generate a voltage across said fourth winding; and said receiver operated in response to said voltage generated by said fourth winding to audibly reproduce said incoming signals; and
   receive signal regulation means connected in parallel with the series combination of said second and third windings operated in response to the sum of said voltages generated by said second and third windings to limit the voltage developed across said second and third windings after a predetermined voltage has been generated across said second and third windings.

2. A transmission circuit as claimed in claim 1, wherein: said receive signal regulation means comprise a varistor connected in series with a resistor.

3. A transmission circuit as claimed in claim 1, wherein: there is further included, a transmitter connected to said second and third windings and to said second line terminal, said transmitter operated to generate outgoing signals to said telephone line.

4. A transmission circuit as claimed in claim 3, wherein: said transmitter comprises a microphone and an amplifier.

5. A transmission circuit as claimed in claim 1, wherein: there is further included a balancing network included in said circuit connection between said third winding and said second line terminal operated to produce maximum power transfer between said transmission circuit and said telephone line by providing an impedance match between said transmission circuit and said telephone line.

6. A transmission circuit as claimed in claim 5, wherein: said balancing network comprises a first capacitor connected in parallel with a series combination of a second capacitor and a resistor.

* * * * *